G. W. RUSSELL.
Brick for Evaporating-Pans.

No. 226,114.  Patented Mar. 30, 1880.

Witnesses.
S. F. Connor.
N. E. C. Whitney.

Inventor.
George W. Russell
by Crosby Gregory
Attys

UNITED STATES PATENT OFFICE.

GEORGE W. RUSSELL, OF LAWRENCE, MASSACHUSETTS.

BRICK FOR EVAPORATING-PANS.

SPECIFICATION forming part of Letters Patent No. 226,114, dated March 30, 1880.

Application filed February 13, 1880.

*To all whom it may concern:*

Be it known that I, GEORGE W. RUSSELL, of Lawrence, county of Essex, State of Massachusetts, have invented an Improvement in Bricks for Evaporating-Pans, &c., of which the following description, in connection with the accompanying drawings, is a specification.

This invention relates to bricks for evaporating-pans to be employed in furnaces for the treatment of liquids to recover from them the chemicals contained therein.

It is well known in the manufacture of paper that the chemicals are recovered from the liquids in which they are contained, so as to be reused. This process is carried on in a furnace, and the last pan in which the chemical is collected in a dry state is composed of fire-brick.

I do not herein claim any specific improvement in such a furnace, nor in any process employed for the recovery of the chemical, as my invention relates only to the shape of the brick composing the pan and to the pan itself.

Heretofore these pans have been formed of small bricks, and it has been quite difficult to keep the joints tight and the pans in perfect condition.

In this my invention I make the pans from brick as long as it is desired for the width of the pan, the said bricks having their longer edges shaped to resemble a cross-section of the pan. The pan may be more or less long, according to the number of bricks employed and their width.

Figure 1:
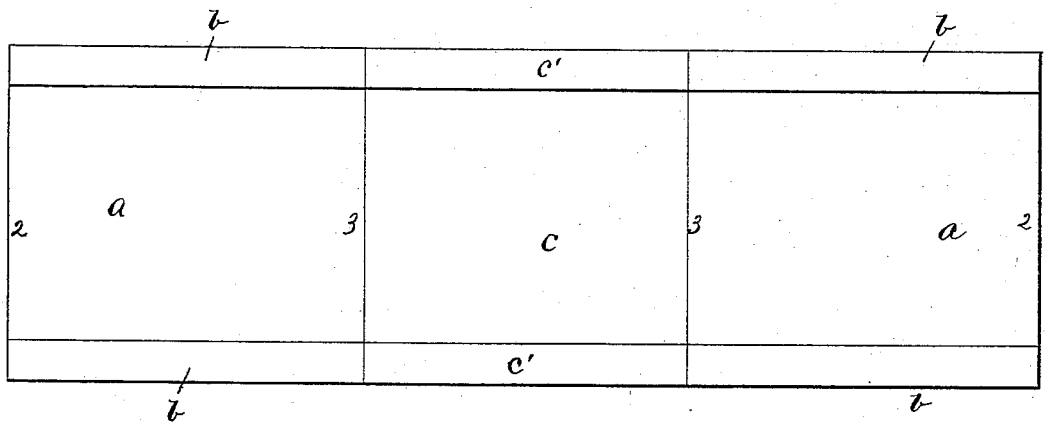
Figure 2:
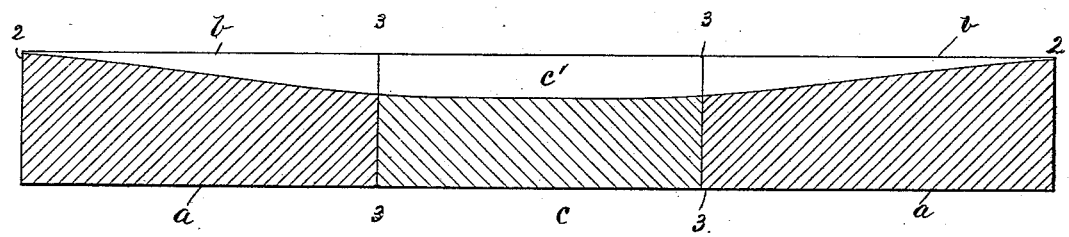

Figure 1 represents, in top view, a brick pan supposed to contain but three bricks; and Fig. 2 a longitudinal section thereof.

The terminal bricks, *a*, of the pan slope from their outer sides, 2, near their ends, to their inner sides on the lines 3 3, as shown in Fig. 2, leaving rims *b*.

The top of each terminal brick is sufficiently below the rim at the innermost edge of the said brick to define the depth of the pan.

The center brick, *c*, (one only being shown,) has at each of its ends a ridge or projection, *c'*, which constitutes the edge or rim of the pan designated by the three bricks placed side to side, as shown in the drawings.

It is obvious that the bricks may be more or less long, according to the width of the pan; that the edges or projections thereon may be more or less high, according to the depth it is desired for the pan, and the pan may be of greater or less length, according to the number of bricks or their width.

The bricks are formed in molds, are composed of fine clay, and burned to make firebricks.

A pan composed of bricks *a c* is stronger, more durable, and quicker and more cheaply made and repaired than is the case with pans as now made of the usual flat-sided brick.

I claim—

1. The improved brick-pan composed of end and central bricks, *a c*, shaped and united substantially as described.

2. The herein-described brick for the construction of brick pans, it being substantially the width of the pan to be made, and being provided with ridges or end projections to constitute rims for the pan, substantially as described.

In testimony whereof I have signed my name to this specification in the presence of two subscribing witnesses.

GEO. W. RUSSELL.

Witnesses:
A. N. BURBANK,
H. G. CORDLEY.